(12) United States Patent
Nejedly et al.

(10) Patent No.: US 11,585,257 B1
(45) Date of Patent: Feb. 21, 2023

(54) METHODS AND SYSTEMS FOR CATALYTICALLY TREATING EXHAUST GASES FROM AN INTERNAL COMBUSTION ENGINE USING SECONDARY AIR INJECTION, AND SECONDARY AIR PUMP FOR USE THEREIN

(71) Applicant: Garrett Transportation I Inc., Torrance, CA (US)

(72) Inventors: Milan Nejedly, Brno (CZ); Pavel Krejci, Brno (CZ); Daniel Turecek, Ostopovice (CZ); Vit Houst, Sestajovice (CZ)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 17/654,602

(22) Filed: Mar. 14, 2022

(51) Int. Cl.
| | |
|---|---|
| *F01N 3/32* | (2006.01) |
| *F04D 17/10* | (2006.01) |
| *F01N 3/30* | (2006.01) |
| *F01N 3/22* | (2006.01) |
| *F01N 3/10* | (2006.01) |
| *F01N 3/20* | (2006.01) |

(52) U.S. Cl.
CPC ............. *F01N 3/323* (2013.01); *F01N 3/306* (2013.01); *F04D 17/10* (2013.01); *F01N 3/10* (2013.01); *F01N 3/2026* (2013.01); *F01N 3/225* (2013.01); *F01N 2240/16* (2013.01); *F01N 2900/16* (2013.01)

(58) Field of Classification Search
CPC .......... F01N 3/10; F01N 3/2026; F01N 3/225; F01N 3/306; F01N 3/323; F01N 2240/16; F01N 2900/16; F04D 17/10
USPC ........................... 60/280, 289, 299, 300, 320
See application file for complete search history.

(56) References Cited

U.S. PATENT DOCUMENTS

| | | | |
|---|---|---|---|
| 2002/0083700 A1* | 7/2002 | Ellmer | F02B 37/04 60/303 |
| 2010/0139267 A1* | 6/2010 | Schliesche | F02M 26/15 60/299 |

* cited by examiner

*Primary Examiner* — Jorge L Leon, Jr.
(74) *Attorney, Agent, or Firm* — John C. James

(57) ABSTRACT

In a turbocharged internal combustion engine (ICE) system, a catalytic treatment device receives exhaust gases from the ICE after they have passed through the turbocharger turbine. The system includes a secondary air pump (SAP) for injecting pressurized air into the exhaust gases ahead of the catalytic treatment device. The SAP is a single-stage centrifugal compressor that includes an air recirculation passage for causing a first portion of the air pressurized by the SAP to be continuously recirculated back to the inlet of the SAP, which is effective for heating the air in the volute of the SAP. A second portion of the pressurized air, having thereby been heated, is injected into the exhaust gases proceeding toward the catalytic treatment device.

11 Claims, 5 Drawing Sheets

METHODS AND SYSTEMS FOR CATALYTICALLY TREATING EXHAUST GASES FROM AN INTERNAL COMBUSTION ENGINE USING SECONDARY AIR INJECTION, AND SECONDARY AIR PUMP FOR USE THEREIN

BACKGROUND OF THE INVENTION

This application relates generally to turbocharged internal combustion engine systems. The application relates more particularly to such engine systems that employ a catalytic treatment device in the exhaust system.

Turbochargers are employed with some internal combustion engines in order to boost the performance of the engine. Exhaust gases discharged from the cylinders of the engine are collected in an exhaust manifold and are supplied to the turbine of the turbocharger to drive the turbine wheel, which in turn drives the compressor wheel of the turbocharger. The compressor pressurizes air and supplies it to the intake manifold of the engine. The overall pressure ratio across the internal combustion engine is thereby increased, allowing the engine to develop increased torque and power output, as well as operate at greater efficiency.

As a result of governmental regulations aimed at reducing harmful exhaust emissions from internal combustion engines, internal combustion engine systems nearly always include a catalytic treatment device (commonly referred to as a catalytic converter) in the exhaust system. Within the catalytic treatment device, the exhaust gases flow through a dense honeycomb structure made from a substrate that is coated with catalysts such as platinum and palladium. Typically, there are two or more different catalysts, such as one that catalyzes a reduction process to convert nitrogen oxides into nitrogen and oxygen, and another that catalyzes an oxidation process to convert carbon monoxide into carbon dioxide.

There is a minimum temperature (called the "light-off temperature") that the catalysts must be heated to before they become effective to convert the $NO_x$ and CO in the exhaust gases into harmless substances. Consequently, during a "cold start" of the engine (for example, after the vehicle has been parked overnight and is started in the morning), there is a period of time before the catalysts have reached their light-off temperature, during which the catalytic treatment device is not effective. This is a significant problem because it has been estimated that as much as 80 percent of total vehicle engine emissions are caused by engine operation during the cold-start period when the catalytic device is ineffective. It is desired to minimize this time period as much as possible.

The present application describes embodiments of methods and turbocharged internal combustion engine systems that employ advantageous means for achieving rapid light-off of a catalytic treatment device.

SUMMARY OF THE DISCLOSURE

The present disclosure describes a method and a system facilitating rapid light-off of the catalyst in a turbocharged internal combustion engine (ICE) system. In accordance with one embodiment of the invention, a catalytic treatment process for exhaust gases from an ICE comprises the steps of:

providing a catalytic treatment device connected to an exhaust conduit carrying exhaust gases from the ICE;

providing a secondary air pump (SAP) comprising a single-stage centrifugal compressor comprising a compressor wheel affixed to a shaft rotatable about an axis, a compressor housing enclosing the compressor wheel and defining an air inlet that leads air into the compressor wheel, the compressor housing defining a volute that receives pressurized air from the compressor wheel, and a recirculation passage connected between the volute and the air inlet for causing a first portion of the pressurized air produced by the compressor wheel to recirculate back to the air inlet;

providing an air injection line connected between the volute of the SAP and the exhaust conduit at a point upstream of the catalytic treatment device for injecting a second portion of the pressurized air into the exhaust gases proceeding toward the catalytic treatment device; and operating the SAP to supply pressurized air into the volute such that the first portion of the pressurized air continuously recirculates so as to heat up the pressurized air in the volute, thereby heating the second portion of the pressurized air injected into the exhaust gases proceeding toward the catalytic treatment device.

In one embodiment, the step of providing the catalytic treatment device comprises providing an electrically heated catalyst (EHC) comprising a housing, a substrate disposed within the housing, a catalyst disposed on the substrate, and an electric heater disposed proximate the catalyst and operable to receive electrical power and produce thermal energy effective to raise the temperature of the catalyst, and further comprising the step of supplying electrical power to the EHC simultaneously with the step of operating the SAP.

In some embodiments of the invention, the first (recirculated) portion of the pressurized air comprises 10% to 40% by mass flow of a total air flow passing through the SAP, and the second (injection) portion of the pressurized air comprises 90% to 60% by mass flow of said total air flow.

In accordance with one embodiment, the method further comprising the step of terminating the injecting of the second portion of the pressurized air upon detecting that a characteristic catalytic process parameter has reached a desired value.

As noted, the invention also includes a turbocharged ICE system. In accordance with an embodiment of the invention, a turbocharged ICE system comprises:

an internal combustion engine (ICE) having an intake manifold for supplying air to cylinders of the ICE, and having an exhaust manifold for collecting exhaust gases from the cylinders;

a turbocharger coupled with the ICE, the turbocharger comprising a compressor and a turbine, the compressor receiving air and compressing the air and supplying compressed air to the intake manifold of the ICE, the turbine receiving exhaust gases from the exhaust manifold and expanding the exhaust gases and discharging the exhaust gases through an exhaust conduit;

a catalytic treatment device connected to the exhaust conduit for receiving and treating the exhaust gases;

a secondary air pump (SAP) comprising a single-stage centrifugal compressor comprising a compressor wheel affixed to a shaft rotatable about an axis, a compressor housing enclosing the compressor wheel and defining an air inlet that leads air into the compressor wheel, the compressor housing defining a volute that receives pressurized air from the compressor wheel, and a recirculation passage connected between the volute and the air inlet for causing a first portion of the pressurized air produced by the compressor wheel to recirculate back to the air inlet; and an air injection line connected from the volute of the SAP to the exhaust conduit at a point upstream of the catalytic treatment device for injecting a second portion of the pressurized air into the exhaust gases proceeding toward the catalytic treatment device.

The system can further comprise a valve connected to the air injection line and adjustable between an open position allowing injection of the second portion of the pressurized air into the exhaust gases, and a closed position preventing said injection.

BRIEF DESCRIPTION OF THE DRAWINGS

Having described the present disclosure in general terms, reference will now be made to the accompanying drawing (s), which are not necessarily drawn to scale, and wherein.

DETAILED DESCRIPTION OF THE DRAWINGS

The present disclosure will now be described in fuller detail with reference to the above-described drawings, which depict some but not all embodiments of the invention (s) to which the present disclosure pertains. These inventions may be embodied in various forms, including forms not expressly described herein, and should not be construed as limited to the particular exemplary embodiments described herein. In the following description, like numbers refer to like elements throughout.

Figure 1:
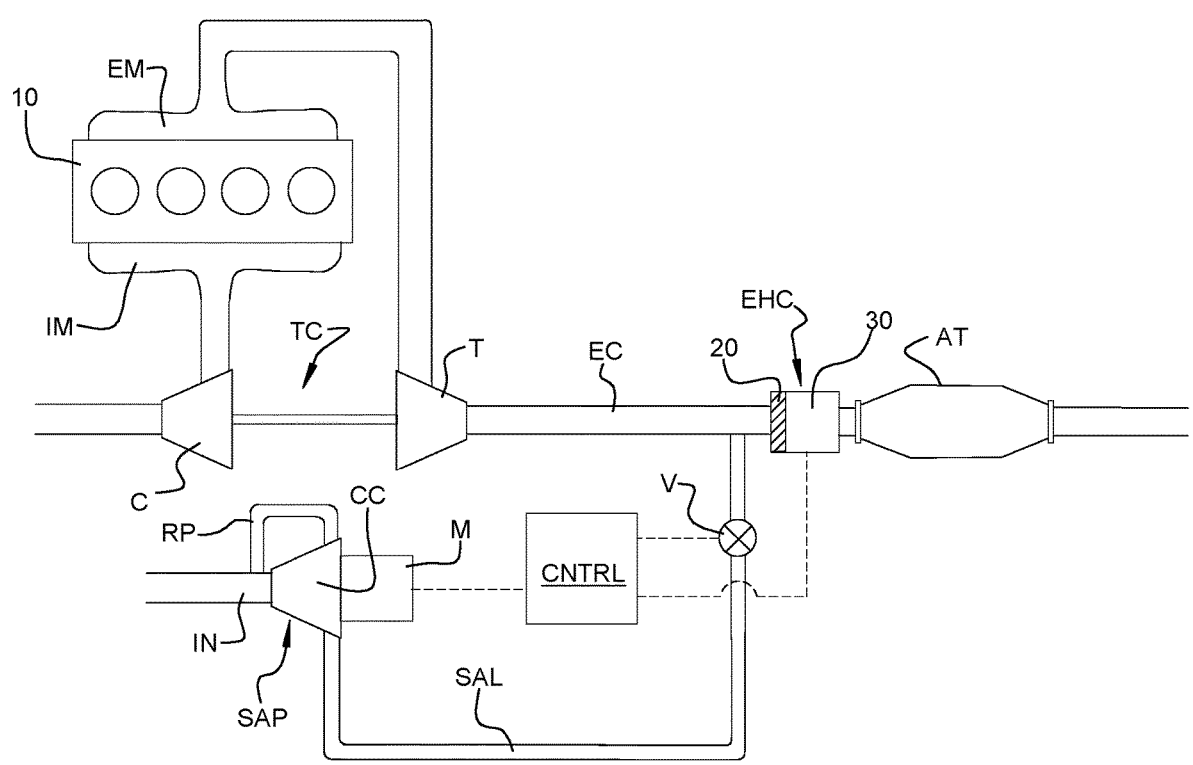
FIG. 1 is a diagrammatic depiction of an internal combustion engine system suitable for employing the catalytic treatment process in accordance with embodiments of the invention.

FIG. 1 illustrates an engine system in which a catalytic treatment process for engine exhaust gases in accordance with embodiments of the invention may be practiced. The engine system includes an internal combustion engine (ICE) 10 having an intake manifold IM for supplying charge air to the cylinders of the engine, to be mixed with fuel and burned within the cylinders, and an exhaust manifold EM for collecting exhaust gases discharged from the cylinders. The system further includes a turbocharger TC comprising a compressor C for compressing air and supplying it as charge air to the intake manifold, and a turbine T that receives exhaust gases from the engine exhaust manifold and expands the gases to produce power that drives the compressor. After passing through the turbine (or in some cases after bypassing the turbine via a waste gate or the like), the exhaust gases process through an exhaust conduit EC. The system further comprises a catalytic after-treatment device AT that receives exhaust gases delivered through the exhaust conduit and reactively treats components of the gases to convert them into essentially harmless substances such as carbon dioxide and water.

The system of FIG. 1 advantageously also includes an electrically heated catalyst EHC, also sometimes referred to as an E-cat, which is a device comprising a catalyst 20 disposed on a substrate of large surface area (e.g., a honeycomb structure), and an electrical heating device 30 in close proximity to the catalyst. Activation of the heating device causes the catalyst of the E-cat to be heated. When the catalyst reaches its light-off temperature, it is then effective for treating the exhaust gases. Typically the E-cat is in series with the main after-treatment device AT, being located just upstream of the main device.

The system also includes a secondary air pump SAP comprising a centrifugal compressor CC operable coupled with an electric motor M for rotatably driving the centrifugal compressor. An air inlet IN leads fresh air into the secondary air pump, which compresses the air and discharges it through a secondary air line SAL into the exhaust conduit EC upstream of the after-treatment device AT. A remotely controllable valve V is disposed in the secondary air line for selectively preventing or allowing air from the secondary air pump to be injected into the exhaust gases ahead of the catalytic after-treatment device, and for regulating the flow rate of secondary air. A controller CNTRL is connected to the motor M of the secondary air pump, to the heater 30 of the E-cat, and to the secondary air valve V for controlling their operation via control signals.

In accordance with the invention, the secondary air pump is equipped with a recirculation passage RP that connects the discharge of the compressor to the air inlet in order to continually recirculate a portion of the total air compressed by the compressor back to the air inlet, as further described below.

Figure 2:
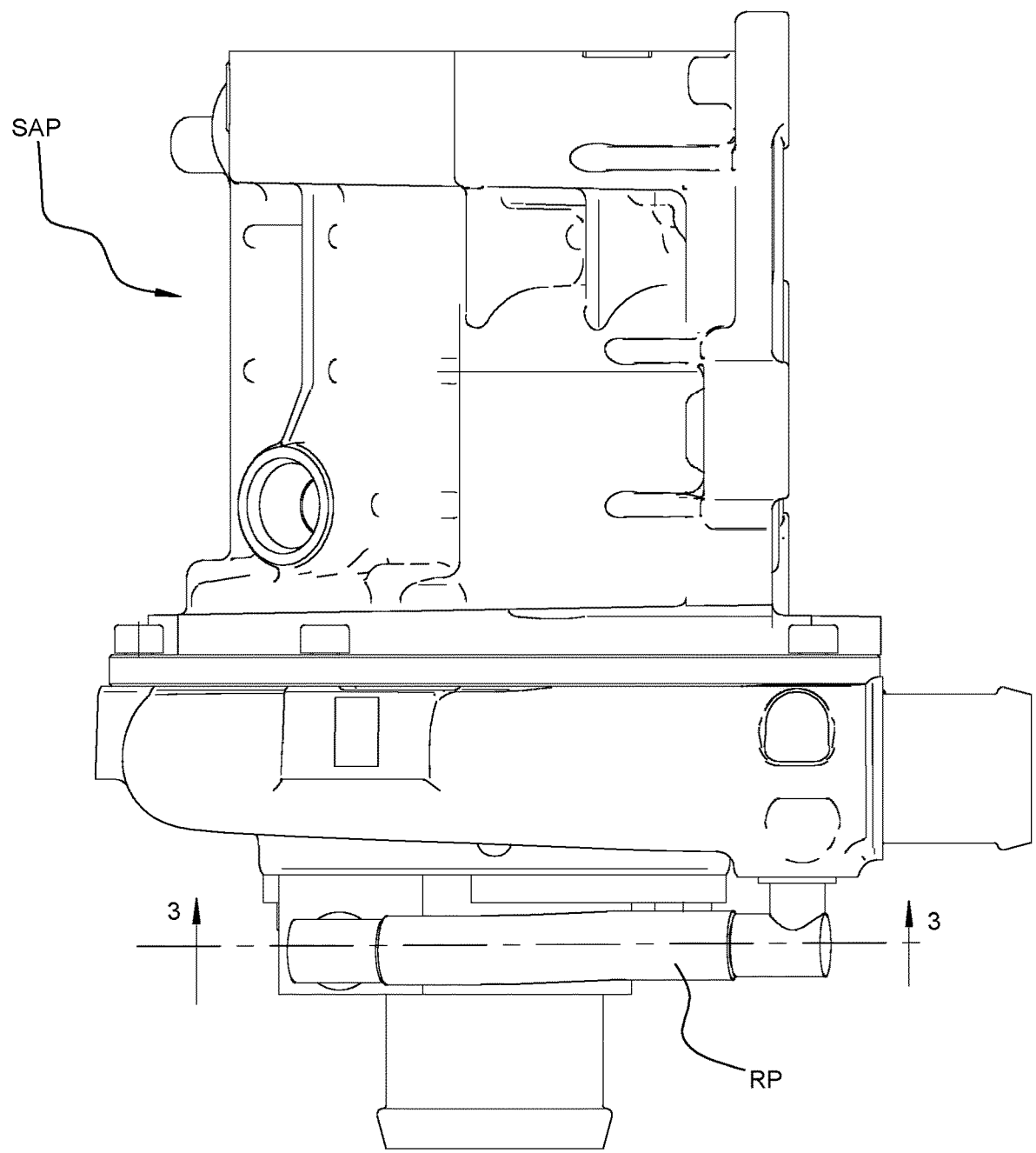
FIG. 2 is a side view of a secondary air pump (SAP) in accordance with one embodiment of the invention.
Figure 3:
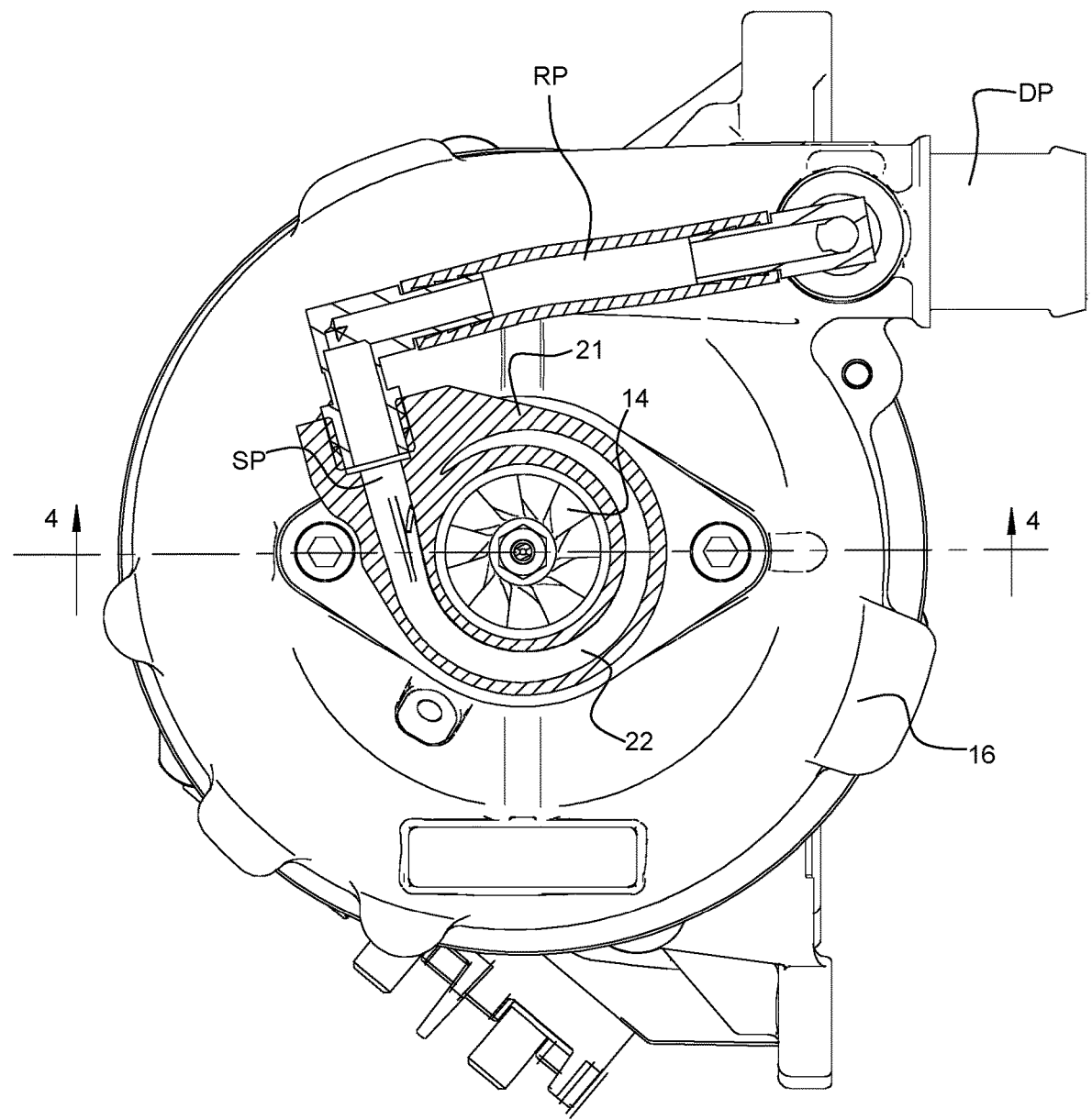
FIG. 3 is a cross-sectional view of the SAP along line 3-3 in FIG. 2.
Figure 4:
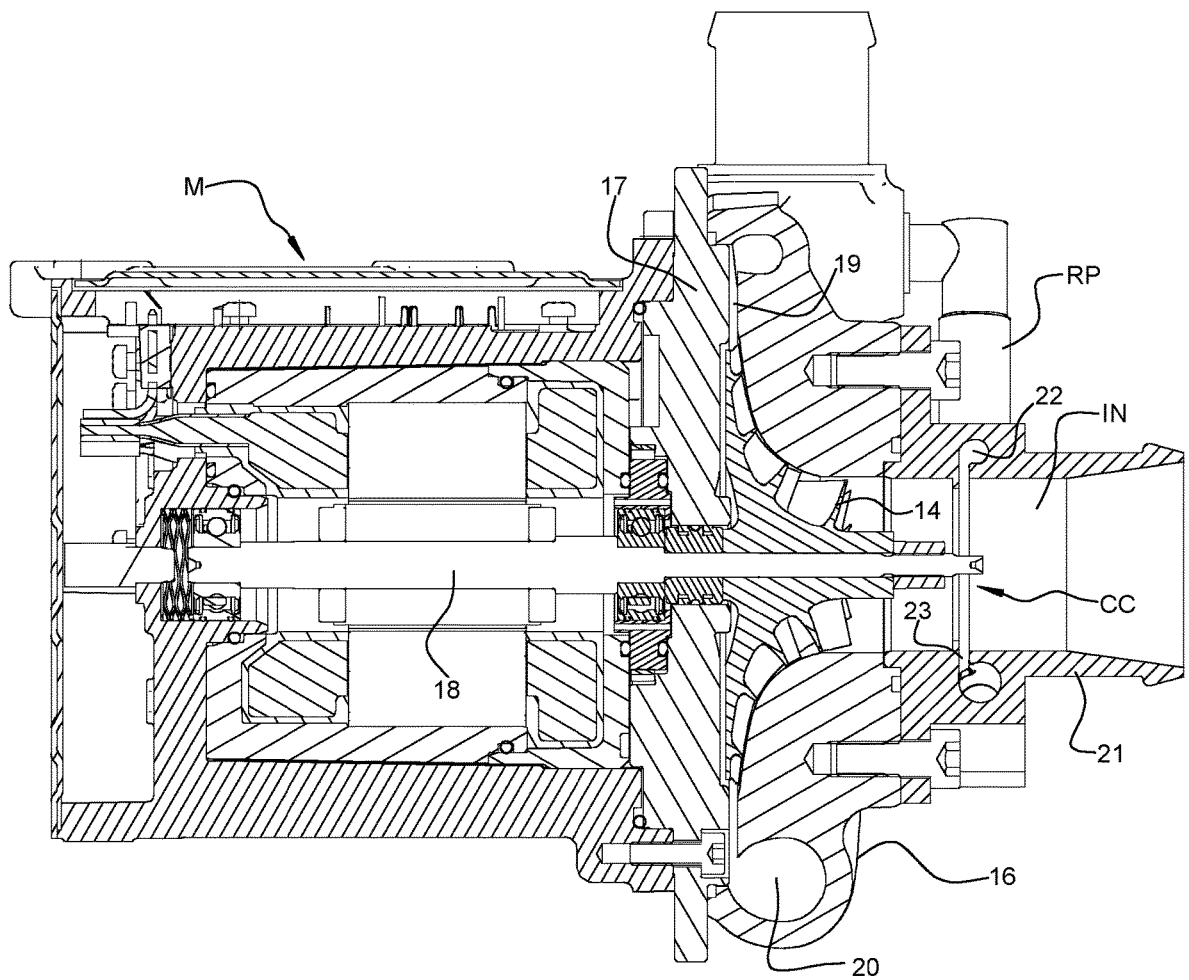
FIG. 4 is an axial cross-sectional view of the SAP along line 4-4 in FIG. 3.

FIGS. 2 through 4 illustrate a secondary air pump SAP in accordance with one embodiment of the invention for use in the process of catalytically treating exhaust gases. The secondary air pump of this embodiment has an external recirculation passage RP as detailed in particular in FIGS. 3 and 4. The secondary air pump comprises a centrifugal compressor CC coupled to an electric motor M via a common shaft 18 supported by bearings in the motor housing. The details of the motor itself are unimportant to the purposes and operation of the invention and hence are omitted from the present description. The centrifugal compressor comprises a centrifugal compressor wheel 14 mounted within a compressor housing 16. The compressor housing defines a shroud surface in close proximity to outer tips of the blades of the compressor wheel, and defines, together with a backplate 17 fastened to the compressor housing, a diffuser 19 for diffusing air that is pressurized by the compressor wheel. The compressor housing also defines a volute 20 for collecting the pressurized, diffused air so that it can be supplied to the internal combustion engine.

In the illustrated embodiment, the air inlet IN to the compressor is defined by a separate cover 21 that is attached to the main compressor housing 16 by fasteners. The cover 21 defines a recirculation volute 22 and an injection passage 23 leading from the recirculation volute into the air inlet. The recirculation passage RP connects the main compressor volute 20 to the recirculation volute 22 so that a portion of the total air pressurized by the compressor is recirculated back to the compressor air inlet.

With reference to FIG. 3, the recirculation passage RP connects with the compressor volute just upstream of the discharge pipe DP through which pressurized air is discharged from the compressor housing for onward supply to the engine. A fitting with a hose barb can be provided as shown, for connection to a flexible hose, the opposite end of the hose being connected via a second fitting with hose barb to the cover 21 of the compressor housing. The cover 21 defines a supply passage SP into the recirculation volute 22.

Figure 5:
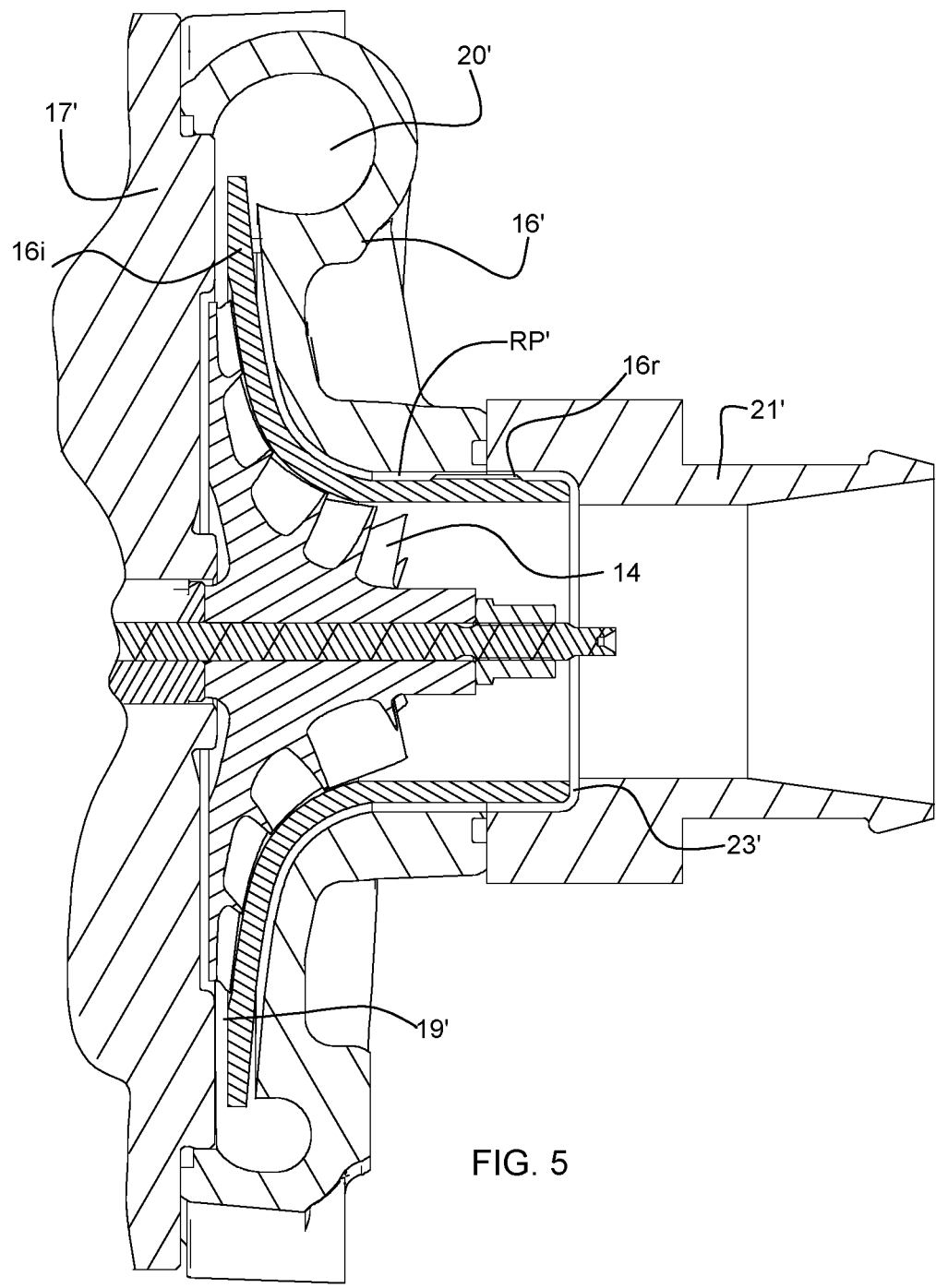
FIG. 5 is a cross-sectional view of a SAP in accordance with a second embodiment of the invention.

FIG. 5 depicts a secondary air pump according to an alternative embodiment having an internal rather than external recirculation passage. Thus, the compressor wheel 14 is mounted within the main compressor housing 16', which defines a volute 20' for receiving the air pressurized by the compressor wheel. A cover 21' connects to the main housing and defines the air inlet for the compressor. The compressor housing assembly includes an insert 16i that defines the shroud adjacent the outer tips of the blades of the compressor wheel. A diffuser 19' is defined between the insert 16i and the backplate 17' affixed to the main housing. A radially outer surface of the insert 16i is spaced radially inward of an adjacent radially inner surface of the compressor housing 16' by means of ribs 16r projecting radially outwardly from the outer surface of the insert, thereby creating an internal recirculation passage RP' that extends from the volute 20' to an injection passage 23' defined between an upstream end of the insert 16i and a radially inwardly extending surface of the cover 21'. The injection passage 23' extends into the air inlet upstream of the compressor wheel. Thus, a portion of the air in the volute 20' proceeds through the recirculation passage RP' and is injected back into the air inlet.

The present invention provides methods for catalytically treating exhaust gases from an internal combustion engine arranged within a system having a secondary air pump in the form of an E-compressor generally as depicted in FIG. 1. Fresh air injection into the exhaust gases from the engine, prior to the after-treatment device, is effective for causing unburned hydrocarbons (UHCs) in the exhaust stream to undergo post-combustion, which reduces the amount of UHCs in the exhaust stream and also increases the temperature of the gases entering the after-treatment device. The challenge in providing such secondary air injection is that the air must have a relatively large pressure ratio (PR) but a relatively low mass flow rate (MFR). This is generally unachievable with a conventional compressor or air pump because a conventional compressor will encounter potentially damaging surge conditions at high PR and low MFR.

In accordance with the invention, the secondary air injected into the exhaust system can have a relatively large pressure ratio and low mass flow rate without encountering damaging surge conditions in the secondary air pump. Additionally, the invention results in the secondary air having increased temperature, which is advantageous for inducing the desired post-combustion of the UHCs in the exhaust stream. These advantages are achieved by means of the structure and operation of the secondary air pump with recirculation passage. As a portion of the air is continually recirculated from the compressor discharge back to the air inlet, the pressurized air in the volute is continually heated by the recirculated portion, and hence the remaining portion that is injected into the exhaust stream is increased in temperature. Furthermore, the continual recirculation of air in the compressor allows the compressor to operate at high PR and low MFR without surging.

An embodiment of a method for catalytically treating exhaust gases from an internal combustion engine comprises the steps of:

(a) providing a catalytic treatment device connected to an exhaust conduit carrying exhaust gases from the ICE;

(b) providing a secondary air pump (SAP) comprising a single-stage centrifugal compressor comprising a compressor wheel affixed to a shaft rotatable about an axis, a compressor housing enclosing the compressor wheel and defining an air inlet that leads air into the compressor wheel, the compressor housing defining a volute that receives pressurized air from the compressor wheel, and a recirculation passage connected between the volute and the air inlet for causing a first portion of the pressurized air produced by the compressor wheel to recirculate back to the air inlet;

(c) providing an air injection line connected between the SAP and the exhaust conduit at a point upstream of the catalytic treatment device for injecting a second portion of the pressurized air into the exhaust gases proceeding toward the catalytic treatment device; and (d) operating the SAP to supply pressurized air into the volute such that the first portion of the pressurized air continuously recirculates so as to heat up the pressurized air in the volute, thereby heating the second portion of the pressurized air that is injected into the exhaust gases proceeding toward the catalytic treatment device.

In some embodiments, the system is also provided with an electrically heated catalyst EHC comprising a catalyst and an electric heater disposed proximate the catalyst and operable to receive electrical power and produce thermal energy effective to raise the temperature of the catalyst. The method can then include the further step of supplying electrical power to the EHC simultaneously with the step of operating the SAP.

Advantageously, the first portion (i.e., the continually recirculated portion) of the pressurized air comprises 10% to 40% by mass flow of a total air flow passing through the SAP, and the second portion (i.e., the portion injected into the exhaust stream) of the pressurized air comprises 90% to 60% by mass flow of said total air flow.

The method can include the step of terminating the injecting of the second portion of the pressurized air upon detecting that a characteristic catalytic process parameter has reached a desired value. The parameter can be, for example, a temperature of the E-cat, or a temperature of the main after-treatment device (particularly in a case where the system does not include an E-cat).

Persons skilled in the art, on the basis of the present disclosure, will recognize that modifications and other embodiments of the inventions described herein can be made without departing from the inventive concepts described herein. Specific terms used herein are employed for explanatory purposes rather than purposes of limitation. Accordingly, the inventions are not to be limited to the specific embodiments disclosed, and modifications and other embodiments are intended to be included within the scope of the appended claims.

What is claimed is:

1. A catalytic treatment process for exhaust gases from an internal combustion engine (ICE), the catalytic treatment process comprising:

providing a catalytic treatment device connected to an exhaust conduit carrying exhaust gases from the ICE;

providing a secondary air pump (SAP) comprising a single-stage centrifugal compressor including a compressor wheel affixed to a shaft configured to rotate about an axis, and a compressor housing enclosing the compressor wheel and defining an air inlet that leads air into the compressor wheel, the compressor housing further defining a volute that receives pressurized air produced by the compressor wheel, and a recirculation passage connected between the volute and the air inlet so as to enable a first portion of the pressurized air to recirculate back to the air inlet;

providing an air injection line connected between the volute and the exhaust conduit at a point upstream of the catalytic treatment device so as to inject a second portion of the pressurized air into the exhaust gases proceeding toward the catalytic treatment device; and operating the SAP such that the first portion of the pressurized air continuously recirculates so as to heat up the second portion of the pressurized air in the volute.

2. The catalytic treatment process of claim 1, wherein the catalytic treatment device comprises an electrically heated catalyst (EHC) including a catalyst and an electric heater disposed proximate the catalyst and operable to receive electrical power and produce thermal energy so as to raise a temperature of the catalyst during the operating of the SAP.

3. The catalytic treatment process of claim 1, wherein the first portion of the pressurized air comprises 10% to 40% by mass flow of the pressurized air passing through the volute, and the second portion of the pressurized air comprises a remaining balance of the pressurized air.

4. The catalytic treatment process of claim 1, further comprising terminating the injecting of the second portion of the pressurized air upon detecting that a characteristic catalytic process parameter has reached a predetermined value.

5. The catalytic treatment process of claim 1, wherein the SAP is driven via an electric motor.

6. A turbocharged engine system comprising:
an internal combustion engine (ICE) including an intake manifold configured to supply air to cylinders of the ICE, and an exhaust manifold configured to collect exhaust gases from the cylinders;
a turbocharger coupled to the ICE, the turbocharger including:
a compressor arranged upstream of the intake manifold, the compressor configured to receive and compress the air to be supplied to the cylinders, and
a turbine arranged downstream of the exhaust manifold, the turbine configured to expand and discharge the exhaust gases through an exhaust conduit;
a catalytic treatment device arranged in the exhaust conduit so as to receive and treat the exhaust gases;
a secondary air pump (SAP) comprising a single-stage centrifugal including a compressor wheel affixed to a shaft configured to rotate about an axis, and a compressor housing enclosing the compressor wheel and defining an air inlet that leads air into the compressor wheel, the compressor housing further defining a volute that receives pressurized air produced by the compressor wheel, and a recirculation passage connected from the volute to the air inlet so as to enable a first portion of the pressurized air to recirculate back to the air inlet; and
an air injection line connected from the volute to the exhaust conduit at a point upstream of the catalytic treatment device so as to inject a second portion of the pressurized air into the exhaust gases proceeding toward the catalytic treatment device.

7. The turbocharged engine system of claim 6, further comprising a valve arranged in the air injection line, the valve configured to switch between an open position allowing injection of the second portion of the pressurized air into the exhaust gases, and a closed position preventing said injection.

8. The turbocharged engine system of claim 6, further comprising an electric motor coupled to the shaft of the SAP so as to rotatably drive the compressor wheel.

9. A secondary air pump (SAP) for use in an internal combustion engine system for supplying pressurized air for injection into exhaust gases discharged from the engine system, the SAP comprising:
an electric motor including a rotary shaft supported in bearings;
a single-stage centrifugal compressor comprising a compressor wheel affixed to the shaft, a compressor housing enclosing the compressor wheel and defining an air inlet that leads air into the compressor wheel, the compressor housing further defining a volute that receives pressurized air produced by the compressor wheel; and
an external recirculation passage connected between the volute and the air inlet so as to enable a first portion of the pressurized air to recirculate back to the air inlet, the external recirculation passage comprising a hose formed separately from the compressor housing and affixed to the compressor housing via two fittings that respectively communicate with the volute and with the air inlet.

10. A secondary air pump (SAP) for use in an internal combustion engine system for supplying pressurized air for injection into exhaust gases discharged from the engine system, the SAP comprising:
an electric motor including a rotary shaft supported in bearings;
a single-stage centrifugal compressor comprising a compressor wheel affixed to the shaft, a compressor housing enclosing the compressor wheel and defining an air inlet that leads air into the compressor wheel, the compressor housing further defining a volute that receives pressurized air produced by the compressor wheel;
an internal recirculation passage connected between the volute and the air inlet so as to enable a first portion of the pressurized air produced by the compressor wheel to recirculate back to the air inlet; and
a separately formed insert configured to be installed within the compressor housing, the insert including a radially inner surface defining a shroud adjacent outer tips of blades of the compressor wheel, and a radially outer surface being radially spaced inward of a radially inner surface of the compressor housing so as to define the internal recirculation passage,
wherein the internal recirculation passage communicates with the air inlet via an injection passage formed between an upstream end of the insert and an adjacent surface of the compressor housing.

11. The secondary air pump of claim 10, wherein the compressor housing further defines a diffuser between a surface of the insert and a backplate affixed to the compressor housing.

* * * * *